United States Patent [19]
Bitsch et al.

[11] Patent Number: 5,130,592
[45] Date of Patent: Jul. 14, 1992

[54] SLIDING ROTOR MOTOR

[75] Inventors: Harald Bitsch, Witten; Hans Mall, Wetter, both of Fed. Rep. of Germany

[73] Assignee: Mannesmann Aktiengesellschaft, Düsseldorf, Fed. Rep. of Germany

[21] Appl. No.: 675,455

[22] Filed: Mar. 26, 1991

[30] Foreign Application Priority Data

Mar. 26, 1990 [DE] Fed. Rep. of Germany ....... 4010008

[51] Int. Cl.⁵ .............................................. H02K 1/06
[52] U.S. Cl. ...................................... 310/209; 310/77
[58] Field of Search ................... 310/209, 191, 77, 92, 310/93; 188/161, 163

[56] References Cited

U.S. PATENT DOCUMENTS 4,877,987 10/1989 Flaig et al. ........................ 310/209

5,019,734  5/1991  Bernd et al. ........................... 310/77

FOREIGN PATENT DOCUMENTS 1037570 2/1959 Fed. Rep. of Germany .
3008615 9/1981 Fed. Rep. of Germany .

*Primary Examiner*—Steven L. Stephan
*Assistant Examiner*—Ed To
*Attorney, Agent, or Firm*—Horst M. Kasper

[57] ABSTRACT

A device for increasing the magnetic axial force of the displacement type armature motor in motors is provided. The device comprises an iron ring (10) furnished with an outer chamfer (11) matching with the conical course of the rotor (6). The spring-loaded pretensioning of the iron ring (10) suffices for the attachment of the brake support casing (7) on the support ribs (8). The iron ring can be permanently and reliably attached to the rotor motor at low expenditure.

20 Claims, 2 Drawing Sheets

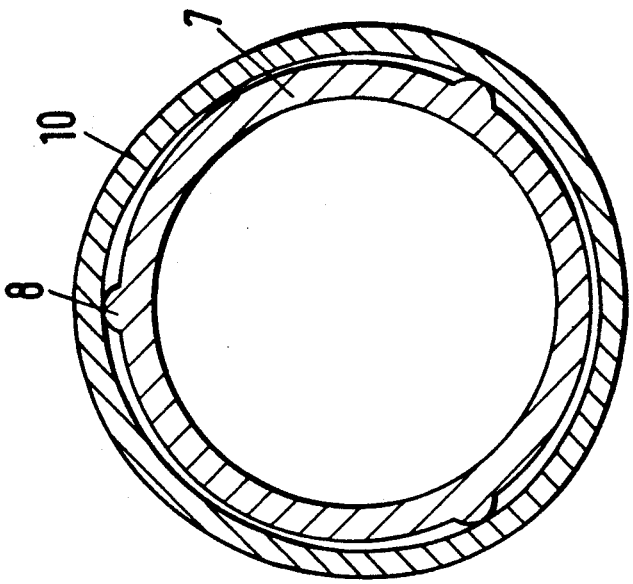
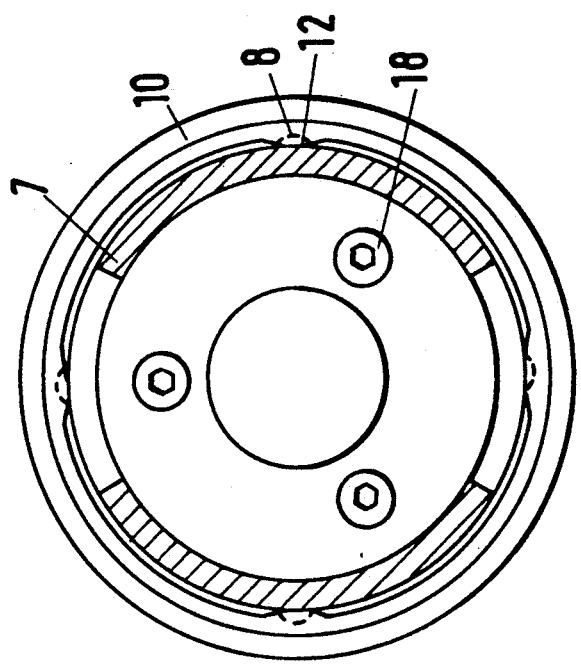

SLIDING ROTOR MOTOR

BACKGROUND OF THE INVENTION

1. Field of the Invention

The invention relates to a displacement type armature motor with a stator coil for a conical rotor, where the rotor can be axially displaced versus the casing with the stator coil and where the rotor carries an iron ring at its large cone side.

2. Brief Description of the Background of the Invention Including Prior Art

The iron ring serves for increasing the magnetic axial force of the displacement type armature motor in motors of this kind according to the German Patent Application Laid Out DE-AS 1,037,570. The iron ring is disposed at the front face of the sheet metal packing of the rotor armature in the neighborhood of the air gap such that a part of the stator leakage flux is deflected from its usual path, running crosswise through the tooth crowns and the groove slots and is lead via the iron body. A part of the stator leakage flux, generated by the stator coil and running generally within the active iron core, is employed for generating the increased magnetic axial force. The attachment of the iron ring on the short-circuit ring is only schematically indicated in the German Patent Application Laid Out DE-AS 1,037,570 and cannot be realized in this way under reasonable expenditures and efforts because of other construction parts in the displacement type armature motor. In addition, a loosening danger exists in this kind of attachment based on the dynamic loads, present in axial and circumferential direction, typically found in displacement type armatures, and connected with frequent temperature changes. For this reason the idea of the German Patent Application Laid Out DE-AS 1,037,570 has not received overall acceptance in practical terms.

A displacement type armature motor is known from the German Patent Application Disclosure DE 3,008,615 Al, where a brake support casing is attached at the rotor at the large cone side, which brake support casing further exhibits ribs.

SUMMARY OF THE INVENTION

1. Purposes of the Invention

It is an object of the present invention to improve a displacement type armature motor such that the known iron ring can be permanently and reliably attached to the rotor at low expenditure.

It is another object of the present invention to provide a method for easy assembly and attachment of an iron ring to a rotor in a displacement type armature motor.

These and other objects and advantages of the present invention will become evident from the description which follows.

2. Brief Description of the Invention

According to the present invention, there is provided for an axial displacement type armature motor comprising stator coil disposed at the casing. A conical rotor is axially shiftable versus the casing with the stator coil. An iron ring is carried by the rotor at the large cone side of the conical rotor. A brake support casing is disposed at the large cone side. Spring support means for supporting the iron ring, using an elasticity exhibited by the ring, are disposed on the brake support casing such that the diameter of the spring support means is slightly larger than the inner diameter of the iron ring.

The spring support means for supporting the iron ring can be furnished by at least three support ribs of the brake support casing. The support ribs can be furnished with tips disposed on a circular arc. This circular arc can be slightly larger than the inner diameter of the iron ring. The stator coil can be furnished with a conical bore. The iron ring can be furnished with an outer side chamfer adapted to the conical bore of the stator coil. The iron ring can protrude with at least one locally folded back and overturned sheet metal into a setoff of the brake support casing. The setoff can be furnished by the end of the support rib. At least three cams can be formed at the brake support casing. The iron ring on the end disposed opposite to the chamfer can rest with its ring face at least at three cams of the brake support casing. The wall thickness of the iron ring can amount from about 3 to 5% of the diameter of the ring and the length of the iron ring, measured in a direction of an axis of the iron ring, can correspond to about ⅓ of the diameter of the iron ring. The thickness of one air gap between the chamfer or the iron ring, respectively, and the stator coil can amount to from about 2.5 to 5 mm.

The brake support casing can be attached with screws, disposed on a circle, to the rotor. A brake lining support can be pressed by the brake spring with a brake lining against a brake face disposed at a front face of the casing.

It has been found that the spring-loaded pretensioning of the iron ring suffices for the attachment of the brake support casing on the support ribs. The amount of deformation of the iron ring is only such that the difference in diameter and the thereby induced distance tolerance relative to the stator coil does not limit or decrease the magnetic efficiency.

According to a further embodiment of the invention, the iron ring is furnished with an outer bevel or chamfer adapted to the conical bore of the stator coil. The outer side chamfer is produced with a cutting tool during the final milling of the outer surface. This chamfer is disposed in the immediate neighborhood of the stator and its winding and is not associated with the non-circular and out-of-round shape of the iron ring generated by the support on the individual support ribs. The iron ring is mortised and caulked locally after the premounting on the end disposed opposite to the chamfer into the setoffs of the brake support casing. The setoffs are formed in a simple way by the ends of the support ribs.

According to a further embodiment of the invention, the enveloping circle of the support ribs is disposed on a circular arc. The diameter of this circular arc is about one percent larger than the inner diameter of the iron ring. The wall thickness of the iron ring amounts to from about 3 to 5% of the diameter of the ring and the axial length of the iron ring amounts to about ⅓ of its diameter. The air gap between the outer chamfer of the iron ring and the stator coil amounts from about 2.5 to 5 mm.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 2 is sectional view of the embodiment of FIG. 1 along section line II—II,

FIG. 3 is a sectional view of the embodiment of FIG. 1 along section line III—III.

DESCRIPTION OF INVENTION AND PREFERRED EMBODIMENT

Figure 1:
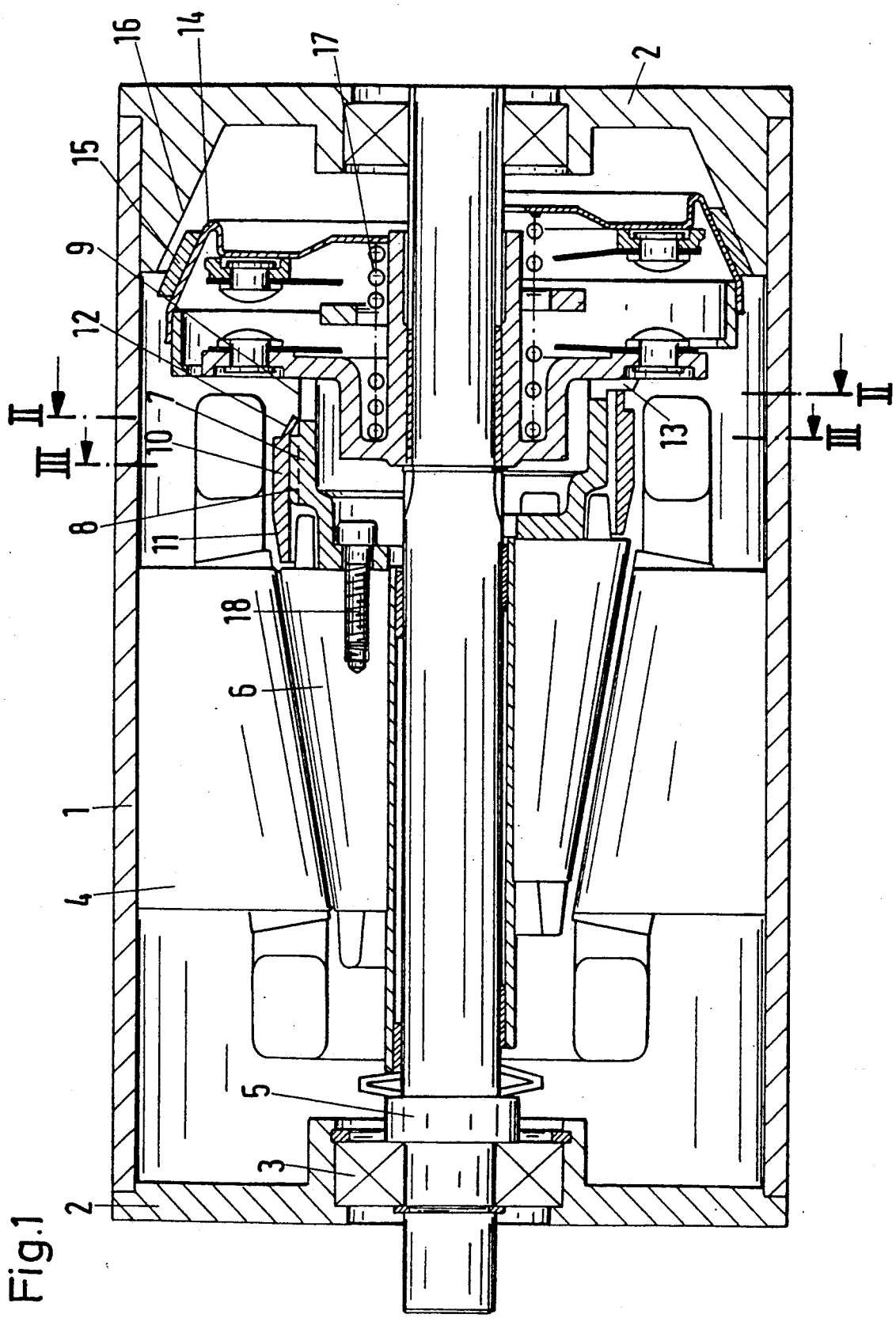
FIG. 1 is an in part sectional view through a displacement type armature motor.

According to the present invention, there is provided an axial displacement type armature motor with a stator coil for a conical rotor. The rotor is axially shiftable versus a casing with the stator coil. The rotor carries an iron ring at its large cone side. The iron ring 10 is springingly supported, under use of an elasticity exhibited by the iron ring, on at least three support ribs 8 of a brake support casing 7 also disposed at the large cone side. The tips of the support ribs 8 are disposed on a circular arc. This circular arc is slightly larger than the inner diameter of the iron ring 10.

The iron ring 10 can be furnished with an outer side chamfer 11 adapted to the conical course of the stator coil 4. The iron ring 10 can protrude with at least one locally folded back and overturned sheet metal 12 into a setoff 9 of the brake support casing 7. The setoff 9 can be furnished by the end of the support rib 8. The iron ring 10 can rest on the end disposed opposite to the chamfer 11 with its ring face at least at three cams 13 of the brake support casing. The wall thickness of the iron ring 10 can amount from 3 to 5% of the diameter of the ring. The length of the iron ring 10, measured in a direction of an axis of the iron ring, can correspond to about ⅓ of the diameter of the iron ring. The thickness of the air gap between the chamfer 11 or the iron ring 10, respectively, and the stator winding 4, can amount from 2.5 to 5 mm.

The brake support casing 7 can be attached with screws 18 disposed on a circle to the rotor 6.

A stator with a stator coil 4 for a rotor 6 is disposed in the casing 1 of the displacement type armature motor. The shaft 5 of the rotor 6 is supported in the front faces 2 of the casing 1 via bearings 3. The rotor 6 is furnished on its large cone side with a brake support casing 7 with three support ribs 8 for an iron ring 10, which can be recognized from FIGS. 2 and 3. The iron ring 10 is furnished with an outer side chamfer 11 matching and coinciding with the conical course of the rotor 6 and with folded-back and overturned sheet metal 12, furnished behind the support ribs 8 in the rebounds or setoffs 9 of the brake support casing 7. The iron ring 10 is affixed in an axial direction by cams 13, which are cast to the brake support casing 7. The slight deformation of the iron ring 10 disposed springingly resting on the support ribs 8 versus the round brake support casing 7 can be recognized in FIG. 3.

The brake support casing 7 is attached at the rotor 6 by way of screws 18. The brake support casing 7 leads to a brake lining support 14 which, in case of a switched-off motor, is pressed by a brake spring 17 with its brake lining 15 against the brake face 16 of the front face 2 of the casing 1.

It will be understood that each of the elements described above, or two or more together, may also find a useful application in other types of armature motors differing from the type described above.

While the invention has been illustrated and described as embodied in the context of a slide armature motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An axial displacement type armature motor comprising
   a casing;
   a stator coil disposed at the casing;
   a conical rotor axially shiftable versus the casing with the stator coil;
   an iron ring carried by the rotor at the large cone side of the conical rotor;
   a brake support casing disposed at the large cone side;
   spring support means for supporting the iron ring using an elasticity exhibited by the iron ring and disposed on ribs of the brake support casing such that the diameter of the spring support means is slightly larger than the inner diameter of the iron ring.

2. An axial displacement type armature motor comprising
   a casing;
   a stator coil disposed at the casing;
   a conical rotor axially shiftable versus the casing with the stator coil;
   an iron ring carried by the rotor at the large cone side of the conical rotor;
   a brake support casing disposed at the large cone side;
   spring support means for supporting the iron ring using an elasticity exhibited by the iron ring and disposed on the brake support casing such that the diameter of the spring support means is slightly larger than the inner diameter of the iron ring,
   wherein the spring support means for supporting the iron ring is furnished by at least three support ribs of the brake support casing, wherein the support ribs are furnished with tips, wherein the tips of the support ribs are disposed on a circular arc, and wherein this circular arc is slightly larger than the inner diameter of the iron ring.

3. The axial displacement type armature motor according to claim 2, wherein the stator coil is furnished with a conical bore, and wherein the iron ring is furnished with an outer side chamfer adapted to the conical bore of the stator coil.

4. The axial displacement type armature motor according to claim 3, further comprising a setoff of the brake support casing, wherein the iron ring protrudes with at least one locally folded back and overturned sheet metal into the setoff of the brake support casing.

5. The axial displacement type armature motor according to claim 4, wherein the setoff is furnished by the end of the support rib.

6. The axial displacement type armature motor according to claim 4 further comprising at least three cams formed at the brake support casing, wherein the iron ring on the end disposed opposite to the chamfer, rests with its ring face at least at three cams of the brake support casing.

7. The axial displacement type armature motor according to claim 1, wherein the wall thickness of the iron ring amounts from about 3 to 5% of the diameter of the ring.

8. The axial displacement type armature motor according to claim 1, wherein the length of the iron ring measured in a direction of an axis of the iron ring corresponds to about ⅛ of the diameter of the iron ring.

9. The axial displacement type armature motor according to claim 1, wherein the thickness of one air gap between the chamfer or the iron ring, respectively, and the stator coil amounts to from about 2.5 to 5 mm.

10. The axial displacement type armature motor according to claim 1, wherein the brake support casing is attached with screws disposed on a circle to the rotor.

11. The axial displacement type armature motor according to claim 1 further comprising
a brake spring;
a brake lining support, wherein the brake lining support is pressed by the brake spring with a brake lining against a brake face disposed at a front face of the casing.

12. An axial displacement type armature motor with a stator coil for a conical rotor, wherein the rotor is axially shiftable versus a casing with the stator coil, and wherein the rotor carries at its large cone side an iron ring, wherein the iron ring (10) is springingly supported, under use of an elasticity exhibited by the iron ring, on at least three support ribs (8) of a brake support casing (7) also disposed at the large cone side, wherein the tips of the support ribs (8) are disposed on a circular arc, and wherein this circular arc is slightly larger than the inner diameter of the iron ring (10).

13. An axial displacement type armature motor with a stator coil for a conical rotor, wherein the rotor is axially shiftable versus a casing with the stator coil, and wherein the rotor carries at its large cone side an iron ring, wherein the iron ring (10) is springingly supported, under use of an elasticity exhibited by the iron ring, on at least three support ribs (8) of a brake support casing (7) also disposed at the large cone side, wherein the tips of the support ribs (8) are disposed on a circular arc, and wherein this circular arc is slightly larger than the inner diameter of the iron ring (10), and
wherein the iron ring (10) is furnished with an outer side chamfer (11) adapted to the conical course of the stator coil (4).

14. The axial displacement type armature motor according to claim 13, wherein the iron ring (10) protrudes with at least one locally folded back and overturned sheet metal (12) into a setoff (9) of the brake support casing (7).

15. The axial displacement type armature motor according to claim 14, wherein the setoff (9) is furnished by the end of the support rib (8).

16. The axial displacement type armature motor according to claim 14, wherein the ring (10), on the end disposed opposite to the chamfer (11), rests with its ring face at least at three cams (13) of the brake support casing (7).

17. The axial displacement type armature motor according to claim 12, wherein the wall thickness of the iron ring (10) amounts from about 3 to 5% of the diameter of the ring.

18. The axial displacement type armature motor according to claim 12, wherein the length of the iron ring (10) measured in a direction of an axis of the iron ring corresponds to about ⅛ of the diameter of the iron ring.

19. The axial displacement type armature motor according to claim 12, wherein the thickness of one air gap between the chamfer (11) or the iron ring (10), respectively, and the stator winding (4) amounts from 2.5 to 5 mm.

20. The axial displacement type armature motor according to claim 12, wherein the brake support casing (7) is attached with screws (18) disposed on a circle to the rotor (6).

* * * * *